3,819,737
EXTRACTIVE DISTILLATION OF
CITRUS LIMONENE
Karl Alfred Kubitz and Alfred Frederick Wicke, Jr., Pensacola, Fla., assignors to Reichhold Chemicals, Inc., White Plains, N.Y.
No Drawing. Filed Aug. 6, 1973, Ser. No. 385,636
Int. Cl. C09f 3/02
U.S. Cl. 260—675.5
13 Claims

ABSTRACT OF THE DISCLOSURE

Limonene and citrus flavor and odor concentrate are separated and recovered from crude citrus limonene by a process of extractive distillation.

BACKGROUND OF THE INVENTION

(1) Field of the Invention

This invention relates to the separation of limonene and of flavor and odorant concentrate from crude citrus limonene by a process of extractive distillation.

Limonene is one of the most industrially important of the monocyclic terpenes. It is useful as a solvent in rubber reclaiming, and in paints and varnishes; as an antiskinning agent for oleoresinous coatings and as a starting material for chemical syntheses. As a chemical raw material, it can be used in the preparation of extreme-pressure additives for lubricants, in the alkylation of phenols, and in the preparation of resins such as limonene-phenol resins and limonene homopolymers.

Resins derived from limonene are of ever-increasing commercial importance for use in printing inks, protective coatings, and adhesives. They are of particular utility as tackifying agents for hot-melt adhesives and pressure-sensitive adhesives.

Limonene occurs naturally, chiefly as a component of the extract from pine stumps, along with rosin and bicyclic terpenes; and as a component of the oil extracted or pressed from citrus fruits such as oranges, lemons, grapefruit, and limes. The oil is particularly obtained from the peel of these citrus fruits.

With the development and growth of the canned and frozen citrus juice (especially orange juice) industry, citrus limonene has become an increasingly important industrial source of limonene for use as a solvent and chemical raw material as well as a source of flavor and fragrance concentrates.

Crude citrus limonene contains relatively large proportions of limonene, and much smaller quantities of aldehydes, ketones, acetals, ketals, esters, and alcohols. Such oxygenated compounds are chiefly responsible for the flavor and fragrance value of citrus limonene. Citrus limonene, such as the orange oil derived from the peel of oranges, finds use as a flavoring material in beverages, foods, and pharmaceuticals.

Since the oxygenated compounds present in citrus limonene are the main contributors to its desirable flavor and odor, it is apparent that its economic value would be enhanced if such oxygenated compounds could be concentrated or separated from the other components. It is also apparent that the economic value as a chemical raw material of limonene derived from crude citrus limonene would be enhanced if its purity could be increased by removal of the oxygenated compounds naturally present in small amounts.

Accordingly, it is an object of the present invention to provide a process by which crude citrus limonene can be separated into limonene of high purity suitable for use as a chemical raw material, such as for the preparation of resins of high softening point, and a flavor and odor concentrate suitable for use in beverages, foods, and pharmaceuticals.

(2) Description of the Prior Art

Limonene of high purity, in the order of 90%–95%, has previously been obtained from crude citrus limonene by distillation. After the juice of citrus fruits such as oranges has been mechanically extracted from the whole fruit for canning or freezing, the by-product skins are treated with lime and pressed. Lime causes a collapse of the spongy structure, thus aiding in extracting the liquid or oil. This press liquor is then concentrated by evaporation or vacuum distillation, and limonene is recovered as a distillate. Vacuum distillation of citrus limonene, however, is a hazardous operation since peroxides are formed during the process and explosive autodecomposition may occur.

In order to avoid the danger of autodecomposition of peroxides, it has been the practice in this art to add strong caustic such as sodium hydroxide to the stillpot to prevent the buildup of acidic products which cause peroxide formation. Although this has been a satisfactory and safe procedure for the separation of high quality limonene from crude citrus limonene, the strong caustic caused decomposition and rearrangement of the aldehydes, ketones, acetals, ketals, esters and alcohols. Thus, the valuable odor and fragrance components in the still residue were destroyed. Prior to the present invention, if it was desired to preserve and recover the flavor and fragrance values from the still residue after distilling out limonene, and avoid the danger of autodecomposition of peroxides, it was necessary to employ costly and highly specialized equipment. Such equipment included means for achieving very high vacuum, and refrigerated stillpots.

SUMMARY OF THE INVENTION

It has now been found, surprisingly, that crude citrus limonene can be distilled safely and without destroying the contained flavor and fragrance values by adding a minor amount of an inert, high-boiling liquid, with which the oxygenated components of the crude citrus limonene are compatible, to the stillpot prior to distilling out limonene. By this extractive distillation process, the valuable flavor and fragrance components are sealed in the high boiling inert liquid medium while the limonene is removed by vacuum distillation. After removal of the limonene, the flavor and fragrance concentrate is isolated from the high boiling liquid by any convenient method, such as by steam distillation or extraction with a volatile solvent immiscible with the high boiling liquid. The flavor and fragrance concentrate can then be recovered as an oil, as by separating and discarding the water layer in the case of steam distillation, or by evaporation of the volatile liquid in the case of extraction.

DETAILED DESCRIPTION OF THE INVENTION

As a medium for sealing in the oxygenated flavor and odor components, any high boiling liquid with which the oxygenated components are miscible and which is inert to the oxygenated components and to limonene can be used. Such liquids include, but are not limited to, saturated and unsaturated aliphatic and cycloaliphatic hydrocarbons, aromatic hydrocarbons, halogen-substituted and oxygen-substituted hydrocarbons, and mixtures thereof. Since the principal uses for the flavor and fragrance concentrate are in foods, beverages, and pharmaceuticals, we prefer to use liquids which are non-toxic and recognized as safe in the processing and handling of foods and drugs. Examples of suitable liquids for the practice of this invention include alpha-pinene dimer oil and white mineral oil. U.S.P. grade white mineral oil is particularly preferred.

Any suitable volatile liquid can be used for extracting the flavor and odor concentrate from the high boiling liquid after the limonene has been removed by distillation. The volatile liquid should be a solvent for, and inert toward, the oxygenated components, and should be substantially immiscible with the high boiling liquid. Preferably it should be non-toxic and recognized as safe for use in the processing and handling of foods and drugs. Such liquids include, but are not limited to, alcohols, ethers, ketones, esters, hydrocarbons, halogenated hydrocarbons, and mixtures thereof. A suitable liquid, or mixture of liquids, should be sufficiently volatile to evaporate from the flavor and fragrance concentrate without the necessity of heating to a high temperature. A particularly preferred volatile solvent is U.S.P. grade ethanol.

Although not essential for the practice of the process of the present invention, if desired, a mildly basic material can be added to the stillpot during the distillation of crude citrus limonene as a precaution against the build-up of acidic materials which could lead to peroxide formation. Any suitable basic material can be used, provided that it is not so strongly basic as to cause rearrangement or decomposition of the valuable esters, aldehydes, ketones, acetals, ketals, and alcohols. Solid mildly basic substances, such as metallic carbonates or ion-exchange resins, are preferred since they are readily separable from the still residue, the high boiling liquid containing the flavor and odor concentrate. Calcium carbonate in the form of limestone or marble is a preferred material. High density aragonite, having a specific gravity of about 2.930, in the form of granules or slabs is especially preferred.

The invention may more readily be understood by reference to the following examples.

EXAMPLE 1

The feed stock for this example was a crude citrus limonene obtained as a by-product from orange peels after removal of the juice from whole oranges. The crude material was found to contain 1.26% aldehydes and ketones by the hydroxylamine method, 0.86% alcohols by acetylation, and 0.45% esters by saponification.

Separate 500 ml. portions of the crude material were subjected to simple distillation at about 20 mm. pressure, during which 90% of the starting material was taken overhead and condensed as limonene. The still residue comprised 10% of the starting material, plus any additive employed.

The first portion contained no additive, and was distilled without incident even though no caustic was employed. It was considered that the explosion hazard was not great on the laboratory scale experiment.

To a second portion, several sodium hydroxide pellets were added prior to distillation.

To a third portion, a few grams of calcium hydroxide were added prior to distillation.

To a fourth portion, about 50 ml. of U.S.P. white mineral oil were added prior to distillation.

To a fifth portion, about 50 ml. of alpha-pinene dimer oil were added prior to distillation.

The results of the analyses of the still residues are summarized in Table I.

TABLE I

| Additive to still | Percent aldehydes and ketones, hydroxylamine methods | Percent alcohols, by acetylation | Percent esters by saponification |
|---|---|---|---|
| None | 6.6 | 3.9 | (1) |
| NaOH | 0 | 4.1 | 0 |
| Ca(OH)₂ | 2.8 | 4.0 | (1) |
| Mineral oil | 9.6 | 10.8 | 3.5 |
| Terpene dimer oil | 7.2 | (1) | (1) |

¹ Not determined.

The results from Example 1 illustrate that distillation in the presence of sodium hydroxide destroyed all of the valuable aldehydes, ketones, and esters. When the weaker base, calcium hydroxide, was used a minor quantity of the aldehydes and ketones were preserved. In the absence of either base, but in the presence of mineral oil or terpene dimer oil, significantly larger quantities of oxygenated materials were preserved.

EXAMPLE 2

Limonene resulting from the distillation of crude citrus limonene in Example 1 was used to prepare limonene homopolymers having a ball and ring softening point of 135° C. Polymerization was carried out using aluminum chloride as a catalyst, by a conventional method well known in the art.

The limonene obtained by distillation in the presence of sodium hydroxide and the limonene obtained by distillation in the presence of U.S.P. white mineral oil each gave a resin having a ball and ring softening point of 135° C., in an overall yield of 68% based on the initial weight of crude citrus limonene.

By way of contrast, a homopolymer resin was prepared from the starting crude citrus limonene which had not been subjected to distillation. The overall yield of resin having a ball and ring softening point of 135° C. was only 57%.

EXAMPLE 3

The concentrate of oxygenated materials in the U.S.P. white mineral oil from Example 1 was liberated from the still residue by steam distillation, and used to prepare orange drinks and orange gelatin dessert. Both were found to be indistinguishable from commercially available orange drinks and orange gelatin in flavor, aroma, and general palatability.

EXAMPLE 4

Five hundred ml. of crude citrus limonene plus 35 ml. of alpha-pinene dimer oil were charged to a flask and distilled at 100 mm. pressure. The still residue comprised the alpha-pinene dimer oil which was charged plus 17 grams of flavor concentrate having a $C_{10}$ aldehyde content of 7.2% by the hydroxyamine hydrochloride method. The crude citrus limonene starting material analyzed 0.98% $C_{10}$ aldehydes by the hydroxylamine hydrochloride method.

EXAMPLE 5

Five thousand seven hundred twenty (5,720) gallons of crude citrus limonene were distilled in the presence of 770 gallons of U.S.P. white mineral oil and six 50 pound slabs of aragonite marble (specific gravity 2.93) at 65° C. and 17 mm. pressure. The distillation required 55 hours, at the end of which time the pot temperature had reached a maximum of 103° C. Eighty-six gallons of citrus flavor concentrate remained in the mineral oil still residue.

The peroxide content of the charged material was 0.02% at the start of the distillation, and at the end of the run 55 hours later the peroxide content of the still residue was 0.01%. The acid number of the charged material was 0.2, and at the end of the run 55 hours later the acid number of the still residue was 0.3.

The still residue comprising mineral oil and citrus flavor concentrate was steamed at 105° C. until only 1% flavor concentrate was found in the steam concentrate. The flavor and fragrance content of the starting feed material was 3.5% by weight, by gas chromatographic analysis. The flavor and fragrance concentrate isolated by steaming the still residue contained 81% by weight active ingredients. This concentrate analyzed 16% by weight $C_{10}$ aldehydes by hydroxylamine hydrochloride method, 16% by weight alcohols by acetylation method, and 8% by weight esters by saponification method.

An 87% overall yield, based on the weight of the crude citrus limonene charged, of a limonene homopolymer resin having a ball and ring softening point of 135° C.

was prepared from the heart cut of the limonene which was separated from the crude by distillation.

From the preceding examples it is apparent that the process of this invention provides a means of separating limonene of quality suitable for resin making in high yield, and flavor and fragrance concentrate of high quality, from crude citrus limonene.

What is claimed is:

1. A process for the separation and recovery of limonene and of citrus flavor and fragrance concentrate from crude citrus limonene which comprises distilling limonene from a mixture of crude citrus limonene and a high-boiling inert liquid, and subsequently isolating said citrus flavor and fragrance concentrate from said high-boiling inert liquid.

2. The process of Claim 1 wherein the mixture of crude citrus limonene and high-boiling inert liquid is in contact with a weakly basic solid substance during the distillation.

3. The process of Claim 2 wherein the solid substance is limestone.

4. The process of Claim 2 wherein the solid substance is aragonite marble.

5. The process of Claim 1 wherein the high-boiling inert liquid is U.S.P. white mineral oil.

6. The process of Claim 1 wherein the high-boiling inert liquid is a terpene dimer.

7. The process of Claim 6 wherein the terpene dimer is alpha-pinene dimer.

8. The process of Claim 1 wherein the distillation is conducted under reduced pressure.

9. The process of Claim 8 wherein the distillation is conducted at a maximum pressure of 50 mm. of mercury.

10. The process of Claim 1 wherein the flavor and fragrance concentrate is isolated from the high-boiling liquid by steam distillation.

11. The process of Claim 1 wherein the flavor and fragrance concentrate is isolated from the high-boiling liquid by extraction with a volatile solvent.

12. The process of Claim 11 wherein the volatile solvent is ethanol.

13. The process of Claim 1 wherein the crude citrus limonene is obtained from oranges.

References Cited
UNITED STATES PATENTS

| | | |
|---|---|---|
| 2,367,269 | 1/1945 | Epstein et al. ____ 260—236.6 X |
| 2,381,732 | 8/1945 | Finley _____ 260—236.6 |
| 2,631,145 | 3/1953 | Othmer et al. ____ 260—236.6 X |
| 2,666,707 | 1/1954 | Beu _____ 260—236.5 |
| 2,712,008 | 6/1955 | Kirchner et al. _____ 260—236.6 |
| 2,993,841 | 7/1961 | Sarno _____ 203—9 X |
| 3,113,031 | 12/1963 | Stanley et al. ____ 260—236.6 X |
| 3,259,555 | 7/1966 | Lankton et al. _____ 203—68 X |
| 3,347,681 | 10/1967 | Platt _____ 260—236.6 X |

DELBERT E. GANTZ, Primary Examiner

G. E. SCHMITKONS, Assistant Examiner

U.S. Cl. X.R.

203—9, 68; 260—236.5, 236.6